United States Patent Office 3,503,028
Patented Mar. 24, 1970

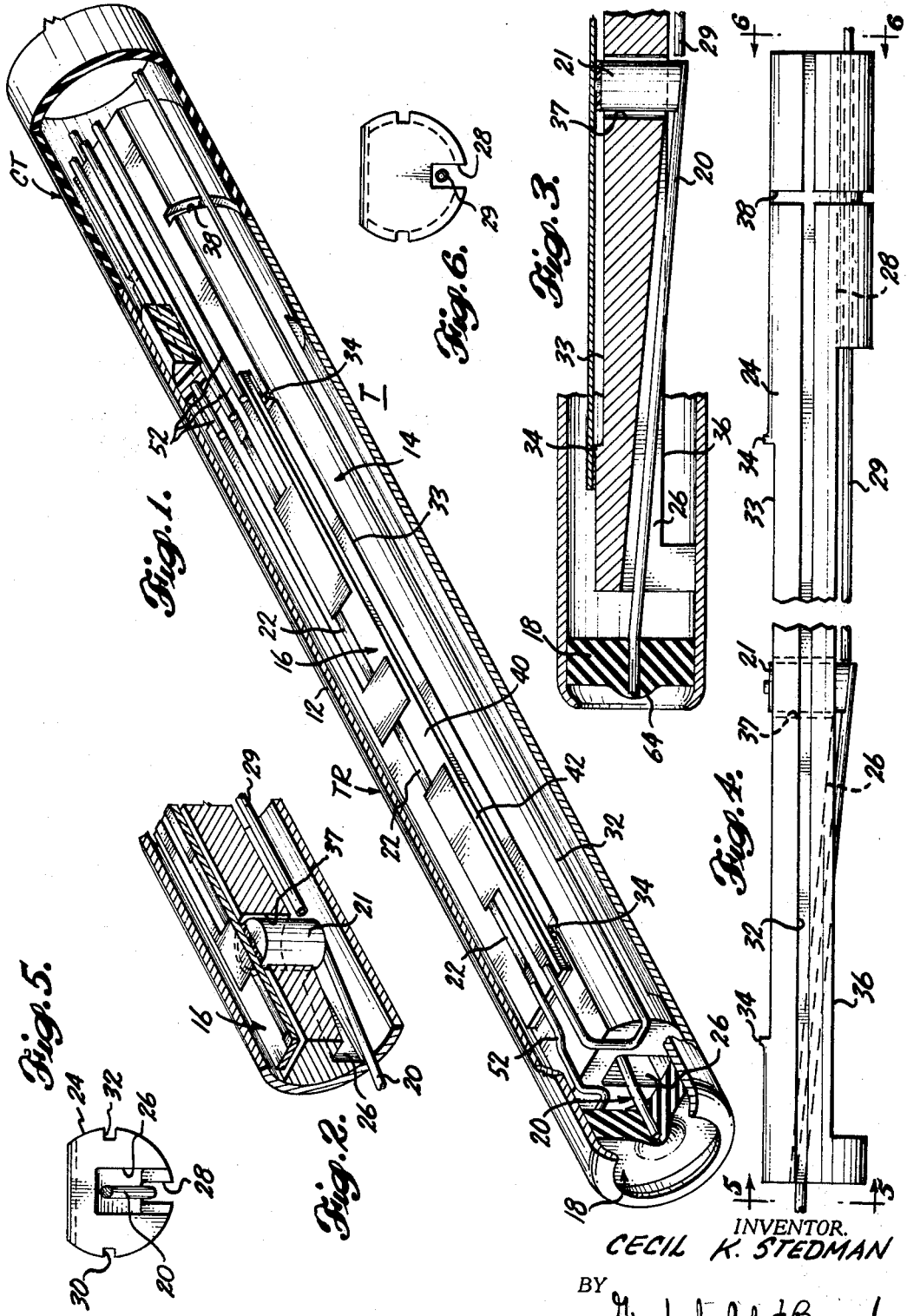

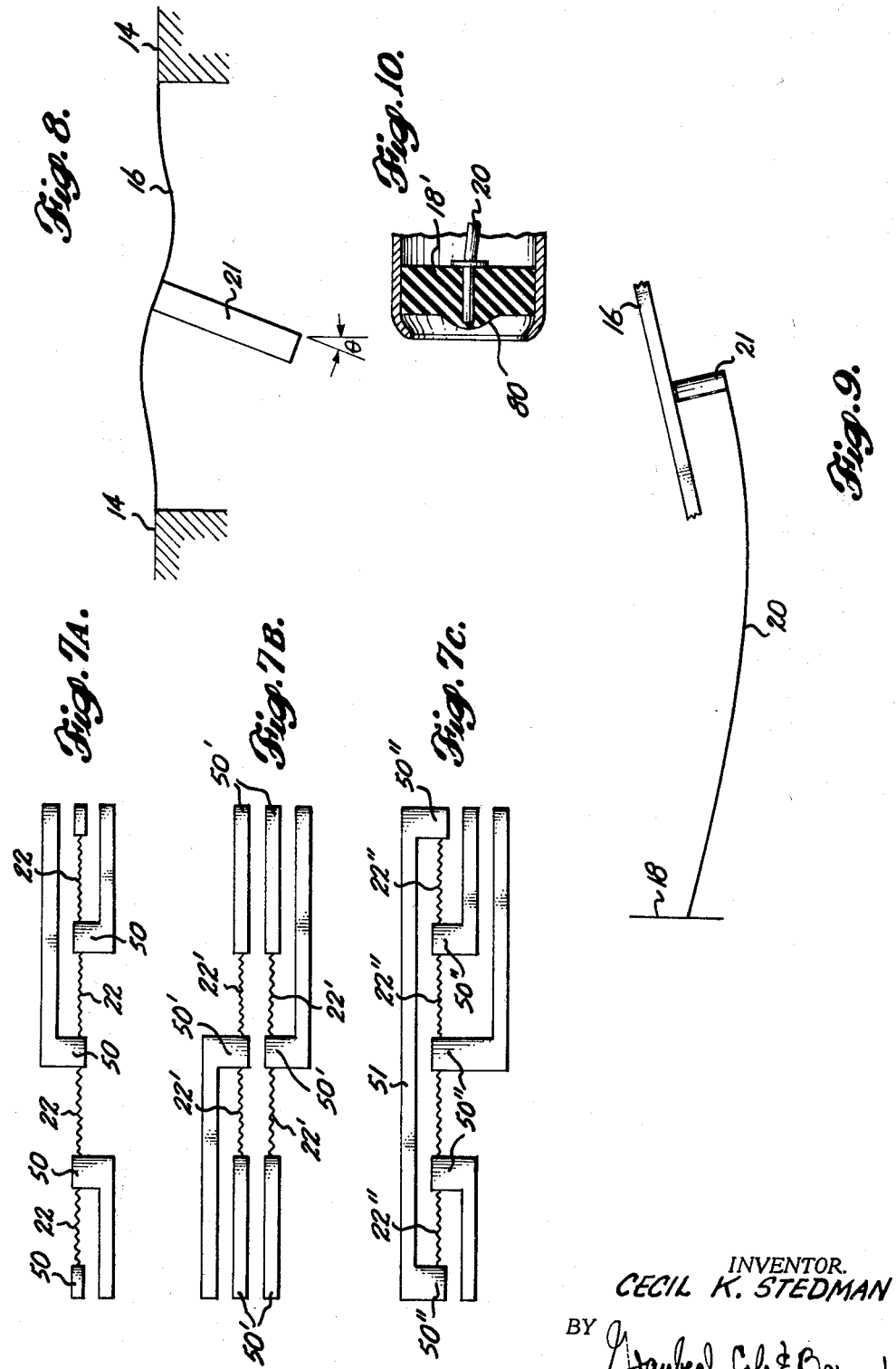

3,503,028
MINIATURIZED PRESSURE TRANSDUCER
Cecil K. Stedman, Enumclaw, Wash., assignor to Statham Instruments, Inc., Los Angeles, Calif., a corporation of California
Filed Dec. 29, 1967, Ser. No. 694,520
Int. Cl. G01l *9/04;* H01c *9/06*
U.S. Cl. 338—4    14 Claims

ABSTRACT OF THE DISCLOSURE

Pressure transducers of the cylindrical type for introcardiac and like applications, employing a fully end-clamped beam positioned lengthwise in a generally cylindrical housing and having a central lever arm interposed between flexural portions. A planar strain gage mounting surface is provided on one face of the beam and electroconductive bridge film elements are vapor deposited or otherwise formed on the flexural portions of said mounting surface. Loading is applied to the beam through the lever arm by an elongate linkage wire extending generally lengthwise of the beam and terminating at its outer end in a flexible rubber diaphragm that is deformable in response to pressure changes at the tip of the housing. Linkage wire flexure allows the lever arm to pivot as well as to transmit the deflections of the diaphragm to thus create a loading moment on the beam. The rubber diaphragm is molded in place within one end of the housing or, in the alternative, may be bonded thereto. The strain sensitive bridge arms are preferably formed as simultaneously deposited films and are advantageously composed of pure chromium in order to obtain a high parallel gage factor (g.p.). The bridge arms are connected to leads arranged within slots in the transducer frame, which leads extend to positions outwardly of the housing where they are connected to form a conventional Wheatstone bridge circuit.

CROSS-REFERENCE TO RELATED APPLICATIONS

Related subject matter, within the scope of certain claims of this application Ser. No. 694,488, is disclosed in my copending application entitled Side Sensitive Miniaturized Pressure Transducer, and filed on Dec. 29, 1967.

BACKGROUND OF THE INVENTION

Field of the invention

The invention relates to improvements in strain sensitive devices of the type commonly known as transducers or strain gages, and more particularly relates to miniaturized pressure sensitive transducers of a type suitable for intracardiac and like applications.

Description of the prior art

Known miniaturized pressure transducers for intro-cardiac and like usages, such as disclosed in Greenwood U.S. Patent 2,634,721, Warnick U.S. Patent 2,981,911, and Stedman U.S. Patent 3,242,449, provide pressure responsive sensitivity by arranging one or more bridge arms on a deformable sleeve or tube and measuring the strain developed by fluid pressure within the sleeve. These types of transducers are susceptible to fluid flow induced inaccuracies and are not capable of accurately sensing the fluid pressure directly at the end or tip of the transducer.

Improved intracardiac transducer efficiency presents several requirements. The instrument should be tip sensitive, i.e. measure pressure at the exposed end of the transducer; should have a small diameter, approximately $\frac{1}{16}''$; and should employ a flexural member of substantial size, with a single bridge arm mounting surface subject to both tensive and compressive stresses. A single bridge arm mounting surface enables simultaneous formation of all arms by vapor deposition to realize greater uniformity of bridge arm operating characteristics, and compound flexure of the arm mounting surface affords greater bridge sensitivity than would otherwise be obtained.

Further information concerning the technology of fabricating deposited film type strain gages may be found in Stedman U.S. Reissue Patent No. 25,924, and Stedman U.S. patent application Ser. No. 633,116, filed Apr. 24, 1967, entitled Transducer Beam With Back-to-Back Related Deposited Flm Type Strain Gages, for example. Additional information may be obtained from the article "Thin-Film Strain-Gage Transducers," by Peter R. Periro, published in the December 1965 issue of Instruments & Control Systems.

SUMMARY OF THE INVENTION

The pressure sensitive transducer of the present invention employs an end-positioned diaphragm coupled to a clamped beam flexural member, with the beam and coupling components having minimal size laterally of the beam, rendering the assembly especially well-suited to miniaturization. According to the invention, the clamped beam and its strain sensitive bridge arms extend lengthwise in a slender transducer housing and the bridge arms are stressed by a deflection moment applied to the beam through a short, laterally extending lever arm and an elongate linkage wire or rod extending generally lengthwise of the beam, with such wire or rod being connected to and moved lengthwise by an elastomeric diaphragm disposed at the tip of the transducer housing. The elongate wire transmits force to the lever arm and also flexes so that the lever arm can pivotally generate a bending moment on the beam. A broader aspect of the invention is the use of an end-clamped flexural beam in a miniaturized pressure transducer whether or not the beam is flexed by a moment or by a lateral deflection. Additional features are that the elastomeric diaphragm is molded in place in the housing, thus obviating various fabrication problems incident to the miniaturized environment. Another feature is the use of bridge elements of high purity chromium film, characterized by an excellent parallel gage factor, thus rendering the bridge arms more strain responsive and simpler to fabricate than would otherwise be the case.

BRIEF DESCRIPTION OF THE DRAWINGS

FIG. 1 is an isometric view, with certain parts broken away for clarity, showing a transducer characteristic of the present invention.

FIG. 2 is a fragmentary isometric of a portion of the transducer shown in FIG. 1.

FIG. 3 is a fragmentary longitudinal section of the transducer shown in FIG. 1.

FIG. 4 is a fragmentary elevation of a portion of the transducer shown in FIG. 1.

FIG. 5 is a vertical section taken along the line 5—5 of FIG. 4.

FIG. 6 is a vertical section taken along the line 6—6 of FIG. 4.

FIGS. 7A–7C portray alternative forms of bridge arm and conductor layouts.

FIG. 8 is a diagrammatic representation showing the nature of the beam and lever arm under loading.

FIG. 9 is a diagrammatic representation showing the linkage rod, lever arm and beam under loading.

FIG. 10 is a detail cross-sectional view of a modified form of diaphragm.

DETAILED DESCRIPTION

In general the invention is best shown in FIG. 1, in which a transducer TR is connected to the end of a catheter tube CT, preferably by cementing. The catheter tubing may be of a conventional type, its function herein however being primarily as a probe to insert the transducer into an artery or other vessel in which the pressure of fluid is to be measured. The transducer includes a cylindrical housing 12 enclosing a frame 14. A portion of the frame 14 extends into the catheter tubing CT and is cemented to the inside wall of the tubing, as shown. An end-clamped flexural beam 16 is bonded to the frame as by cementing and a pressure responsive deformable diaphragm 18 is molded in one end of the housing. The diaphragm is connected to the beam by means of an elongate linkage wire or rod 20 and a linkage pin or lever arm 21 located centrally of the beam. Strain sensitive electroconductive elements or bridge arms 22 are bonded to the flexural portions on the upper surface of the beam.

With the transducer TR located in a narrow fluid channel, such as an artery, the forward placed diaphragm is directly exposed to the fluid under test, and the fluid pressure flexes the diaphragm 18 which in turn transmits force through linkage rod 20 and pin 21 to the beam 16. As shown diagrammatically and on an exaggerated scale in FIGS. 8 and 9, the beam deforms, resulting in strain induced changes in resistance in the bridge arms 22. Bridge arms 22 are interconnected as a Wheatstone bridge circuit in a manner conventional in the art, and the strain induced thus measured in a known manner.

The frame 14, as best shown in FIGS. 1 and 3-6, is formed of an elongate machined bar and in cross-section is generally the shape of a cylinder with a chordal segment removed (FIGS. 5 and 6). An inclined slot 26 is formed in one end of the frame, hereinafter referred to as the diaphragm end, and extends approximately to the center of the frame. This slot serves to house the linkage rod 20 and provides space for it to flex. A utility slot 28 is formed in the opposite end, hereinafter referred to as the catheter end, of the frame. A vent tube 29 is lodged in the utility slot and serves the dual purpose of venting or pressurizing the housing and also of providing an overload stop behind the lever arm 21. Longitudinal grooves 30, 32 are provided along the entire length of each side of the frame for a purpose to be later described. As mentioned above, a chordal segment of the frame is removed, thus forming a flat portion which is provided with a recess 33 extending across the entire width of the frame. The ends of the recess are provided with upstanding support ledges 34 to which the underside of the beam 16 is cemented or otherwise attached. If desired, however, these ledges may be omitted and the beam cemented directly on the flat portion. The frame also has a lower recess 36 parallel to the recess 33 that serves, if desired, as a utility area for mounting balancing bridge arms (not shown), such as often conventionally employed to compensate temperature effects on the primary bridge arms. A central bore 37 is provided in the frame to house the lever arm. At the catheter end of the frame a circumferential groove 38 is provided to receive the bonding agent (not shown) securing the frame to the catheter tubing.

The beam 16, which preferably is stainless steel, is positioned on the support ledge 34 and, as mentioned above, is cemented or otherwise affixed to the frame 14. The beam is provided with a strain gage mounting surface 40 having flexural portions 42, 44 disposed on each side of its mid-point. The mounting surface 40 has bonded thereto an insulative substrate, not shown, of silicon monoxide (SiO) film or the like, on which is bonded the bridge arms 22 preferably in the form of a single strip of deposited chromium film. The procedure for deposition of these films is known per se. In the preferred embodiment the width of the bridge arms is in the range of 0.002–0.004 inch and the thickness is selected by known fabrication techniques to provide the desired nominal resistance in each arm, a suitable range of sheet resistance in this respect being about 60 to 600 ohms per square, providing a per arm resistance of about 500 to about 5000 ohms, for example.

In the alternative, the bridge arms 22 may be fabricated in any other well-known manner, such as by being preformed film strips or wire, and cemented to the insulative substrate.

An important specific feature of the preferred form of the invention is that the strain sensitive film is deposited chromium film rather than a cermet alloy (e.g. Cr-SiO) film or the like. The chromium film has a higher gage factor, a parallel gage factor (g.p.) of about 12 and a transverse gage factor of about 10 or an effective gage factor of about 8, for example, as compared with a Cr-SiO film which has an effective gage factor of about 2. The chromium film arms are thus rendered markedly more responsive in terms of change in resistance with beam flexure.

As shown in FIGS. 1 and 7A, the strain sensitive film is divided into four separate bridge arms 22 by a plurality of conductor tabs 50. The conductor tabs are also fabricated of deposited film and suitably also composed of chromium, deposited to a substantially greater film thickness. In the preferred embodiment, for example, the tab deposition is continued until the conductor tabs have a thickness sufficient to give a sheet resistance of approximately 2 ohms per square. The width of the various tabs at the narrowest portion of each is approximately .005 inch in the selected example. Leads 52 are welded to the conductor tabs and pass outwardly of the housing to the power supply and null indicator of the Wheatstone bridge circuit (not shown). Two of the leads 52 are channeled in the grooves 30 and 32. Preferably another insulative (e.g. SiO) coating, not shown, is applied over the strain sensitive film and conductor tabs to protect them from oxidation and moisture, and to provide mechanical protection.

One of the advantageous features of the invention is the construction of the diaphragm 18. Preferably it is molded in place using a self-vulcanizing silicone rubber. A suitable rubber is manufactured by the Dow Corning Corporation under the trademark Silastic RTV 891. Although the diaphragm could be fabricated externally of the housing and cemented into place, the molding of the diaphragm in place is particularly advantageous in miniaturized transducers.

The linkage wire 20 is preferably of 304 stainless steel wire and is relatively limber. The diameter of the wire is dependent upon the flexibility of the beam and the wire should be sufficiently limber to permit the desired pivotal movement of the lever arm but should not be so limber as to buckle. It has been determined that the total angular deflection $\theta$ of the beam and thus its response is as follows:

$$\theta = \frac{LP}{K_\theta}\left[1 + \frac{EI_w}{K_\theta} \frac{\frac{l_w}{j}}{j\left(1 - \frac{l_w}{j}\cot\frac{l_w}{j}\right)}\right]^{-1} = \frac{LP}{K_\theta}[1+N]^{-1}$$

where L=length of lever arm, P=the load passed to the end of the linkage wire by the diaphragm, $K_\theta$=angular stiffness of the beam, E=the modulus of elasticity of the linkage wire, $I_w$=moment of inertia of the linkage wire, $l_w$=length of linkage wire, $j^2 = EI_w/P$, and with the term N defining the quantity that embodies the effect of the linkage rod on the response. Increasing values of N cause reduction in sensitivity and increase in response non-linearity whereas decreasing values of N eventually lead to buckling in the linkage rod. In general N should be as low as practicable (not over about $N=0.6$) and at least about 0.25 (providing a safety factor of about 4 above the "buckling" value of $N=0.06$).

As shown in FIGURE 3, one end of the wire 20 projects into a central aperture in the diaphragm 18 and the aperture around the wire is filled with silicone rubber. A small boss 64 of silicone rubber is formed on the diaphragm to increase the effective area of the diaphragm. The purpose and function of such a diaphragm stiffening boss is discussed in my U.S. Patent No. 3,341,794, for example. As mentioned earlier, the linkage wire 20 is also fastened to the free end of the lever arm 21. When the diaphrgam is deformed due to a change in pressure externally of the housing, a force is transmitted through the linkage wire to the lever arm, and the limberness of the wire allows the lever arm to pivot (FIG. 9) thus creating a moment in the beam 16.

In general, the theory and mode of operation of the illustrated fully clamped beam 16 is similar to that of the fully clamped beam described in my copending U.S. Patent No. 3,440,872, which issued Apr. 29, 1969, and is entitled "Strain Gage Assembly Involving Clamped Beam With Planar Strain Gage Mounting Surface and Oppositely Inflected Strain Gages," the pertinent portions of which are incorporated herein by reference. An example of a satisfactorily tested embodiment employing this theory is given below, utilizing a beam of 347 stainless steel and a linkage wire of 304 stainless steel:

beam width—0.030"
beam thickness—0.0020"
beam length—0.270"
lever arm diameter—0.030"
lever arm length—0.036"
housing inside diameter—0.055"
linkage wire diameter—0.005"
linkage wire length—0.240"
diaphragm effective area—approximately 0.00094 sq. in.
diaphragm thickness—approximately 0.01"

FIGS. 7A–7C show the preferred and alternative forms of placing the strain sensitive bridge arms 22 and associated conductors. In the preferred embodiment (FIG. 7A) the strain sensitive elements 22 are arranged in a single line along the longitudinal center line of the beam, with interspersed conductor tabs 50, three tabs exiting at the catheter end of the beam and two tabs exiting at the diaphragm end. In FIGS. 7B the strain sensitive elements 22' are in parallel pairs with conductor tabs 50' individually separating each element. In the embodiment shown in FIG. 7C, strain sensitive elements 22" are arranged in a single line along the length of the beam but in this embodiment and end conductor tabs 50" are joined by a conductor strip 51. FIG. 7A is the preferred arm pattern and conductor arrangement because it has the least width overall and can be better accommodated on narrow beam 16. As will be apparent, all of the foregoing bridge arm and conductor arrangements are suitable for use in a Wheatstone bridge circuit such as is described in the aforementioned application Ser. No. 593,447.

FIG. 10 shows an alternative form of the diaphragm designated 18'. In this form a small metal disc 80 is preferably emplaced and cemented around the tip of the linkage wire abutting the inside surface of the diaphragm.

It will be understood that various further modifications may be made in the construction and application of the disclosed assemblies. Consequently, the scope of the invention is not limited to the specific forms thereof illustrated and discussed but is to be determined by the following claims.

What is claimed is:

1. A miniaturized pressure transducer for intracardiac and like applications, comprising:
    (a) an elongate, generally cylindrical housing;
    (b) a flexural beam positioned lengthwise in said housing and having a flexural strain gage mounting surface; and rigid support means at an end of the beam;
    (c) strain sensitive elements mounted on said strain gage mounting surface;
    (d) pressure responsive deformable means in said housing; and
    (e) means interconnecting said pressure responsive deformable means and said beam including a beam flexing member attached to said beam generally centrally thereof and linkage means interconnecting said beam flexing member and said pressure responsive deformable means.

2. The transducer of claim 1, wherein said pressure responsive deformable means is positioned at an end of said housing.

3. The transducer of claim 1, wherein said linkage means is an elongate, relatively limber rod.

4. The transducer of claim 3, further including a frame, a central bore in said frame, an inclined longitudinal slot adapted to receive said elongated rod, and a recess spanned by said flexural beam.

5. The transducer of claim 1, wherein said cylindrical housing is no greater than about 0.065 inch in diameter.

6. The transducer of claim 1, wherein said pressure responsive deformable means is a rubber diaphragm.

7. The transducer of claim 6, wherein said diaphragm is molded in place.

8. A strain gage assembly, comprising:
    (a) a flexural beam having a strain gage mounting surface;
    (b) a lever arm fastened centrally of said beam for producing deflection of the beam in response to application of a force to said arm;
    (c) a plurality of strain sensitive elements secured to said strain gage mounting surface;
    (d) an elongated force transmitting rod fixed to said lever arm, said force transmitting rod being relatively limber for bowing under the influence of a force applied longitudinally thereof enabling said lever arm to pivot and convert longitudinal movement of the rod to pivotal deflection of said beam.

9. The strain gage assembly of claim 8, further including means for applying a force longitudinally of said rod.

10. A pressure transducer including a housing, a flexural member within said housing and having a single strain gage mounting surface, a plurality of strain sensitive elements mounted on said surface, an elastic diaphragm placed in said housing and being deformable in response to pressure changes to be measured, and force transmitting means secured to said diaphragm and generally centrally of said flexural member for applying a deflecting moment to said flexural member.

11. The pressure transducer of claim 10, wherein said diaphragm comprises an elastomeric material molded in place in said housing.

12. The pressure transducer of claim 11, further including a diaphragm stiffening disc fastened to said force transmitting means and to said diaphragm.

13. The pressure transducer of claim 10, wherein said force transmitting means is secured generally centrally of said diaphragm.

14. A miniaturized pressure transducer for intracardiac and like applications, comprising:
    (a) an elongate, generally cylindrical housing;
    (b) a flexural beam positioned lengthwise in said housing and having a flexural, nominally substantially planar, strain gage mounting surface;
    (c) rigid support means at both ends of said beam;
    (d) strain sensitive elements mounted on said strain gage mounting surface;
    (e) pressure responsive deformable means in said housing; and
    (f) means interconnecting said pressure responsive deformable means and said beam for transforming movement of said pressure responsive deformable means into flexural movement of said beam, such beam movement generating both areas of tension and areas of compression in said gage mounting surface.

References Cited

UNITED STATES PATENTS

| 2,772,569 | 12/1956 | Ruge | 338—4 |
|---|---|---|---|
| 2,858,400 | 10/1958 | Statham | 338—5 |
| 2,959,056 | 11/1960 | Traite | 73—398 |
| 3,303,452 | 2/1967 | Booth | 73—141 |
| 3,341,794 | 9/1967 | Stedman | 338—4 |
| 3,411,361 | 11/1968 | McLellan | 338—4 X |

RICHARD A. FARLEY, Primary Examiner

HERBERT C. WAMSLEY, Assistant Examiner

U.S. Cl. X.R.

73—398; 338—42